United States Patent [19]
Bianco

[11] Patent Number: 5,689,243
[45] Date of Patent: Nov. 18, 1997

[54] SYSTEM AND METHOD FOR TAMPER DETECTION

[75] Inventor: Mark E. Bianco, Diamond Bar, Calif.

[73] Assignee: Hughes Aircraft Company, Los Angeles, Calif.

[21] Appl. No.: 585,325

[22] Filed: Jan. 11, 1996

Related U.S. Application Data

[63] Continuation of Ser. No. 994,439, Dec. 21, 1992, abandoned, which is a continuation of Ser. No. 674,823, Mar. 22, 1991, abandoned.

[51] Int. Cl.[6] .................................................. G06F 7/04
[52] U.S. Cl. ........................... 340/825.3; 340/825.31; 340/541; 340/568; 380/23
[58] Field of Search .......................... 340/825.3, 825.31, 340/825.32, 825.34, 534, 541, 543, 568, 569, 571; 380/4, 23, 25; 235/382.5

[56] References Cited

U.S. PATENT DOCUMENTS

| | | | |
|---|---|---|---|
| 4,262,284 | 4/1981 | Stieff et al. | 340/568 |
| 4,766,419 | 8/1988 | Hayward | 340/568 |
| 4,812,994 | 3/1989 | Taylor et al. | 340/825.31 |
| 4,833,455 | 5/1989 | Bishop | 340/568 |
| 4,944,008 | 7/1990 | Piosenka et al. | 380/23 |
| 5,053,748 | 10/1991 | Stern | 340/541 |
| 5,081,676 | 1/1992 | Chou et al. | 380/4 |
| 5,191,613 | 3/1993 | Graziano et al. | 340/825.31 |

*Primary Examiner*—Jeffery Hofsass
*Assistant Examiner*—Andrew Hill
*Attorney, Agent, or Firm*—Georgann S. Grunebach; Michael W. Sales; Wanda Denson-Low

[57] ABSTRACT

A system and method that provides an electronic indication that unauthorized access has been gained to a system. The mechanisms used by the present invention cannot be forged, bypassed, or subverted. In fact, even persons authorized to access the environment cannot do so without leaving evidence. When an intrusion is detected, a random number is generated. This random number, referred to as an audit count, is then encrypted and stored, and a sequence number is incremented. To recover this information at a later time, a trusted individual inserts an external device containing a decryption key. The decryption key is extracted, and the encrypted audit count and sequence number are decrypted and displayed. Periodic verification that the audit count and sequence number have not changed provides assurance that access has not been gained to the system.

5 Claims, 2 Drawing Sheets

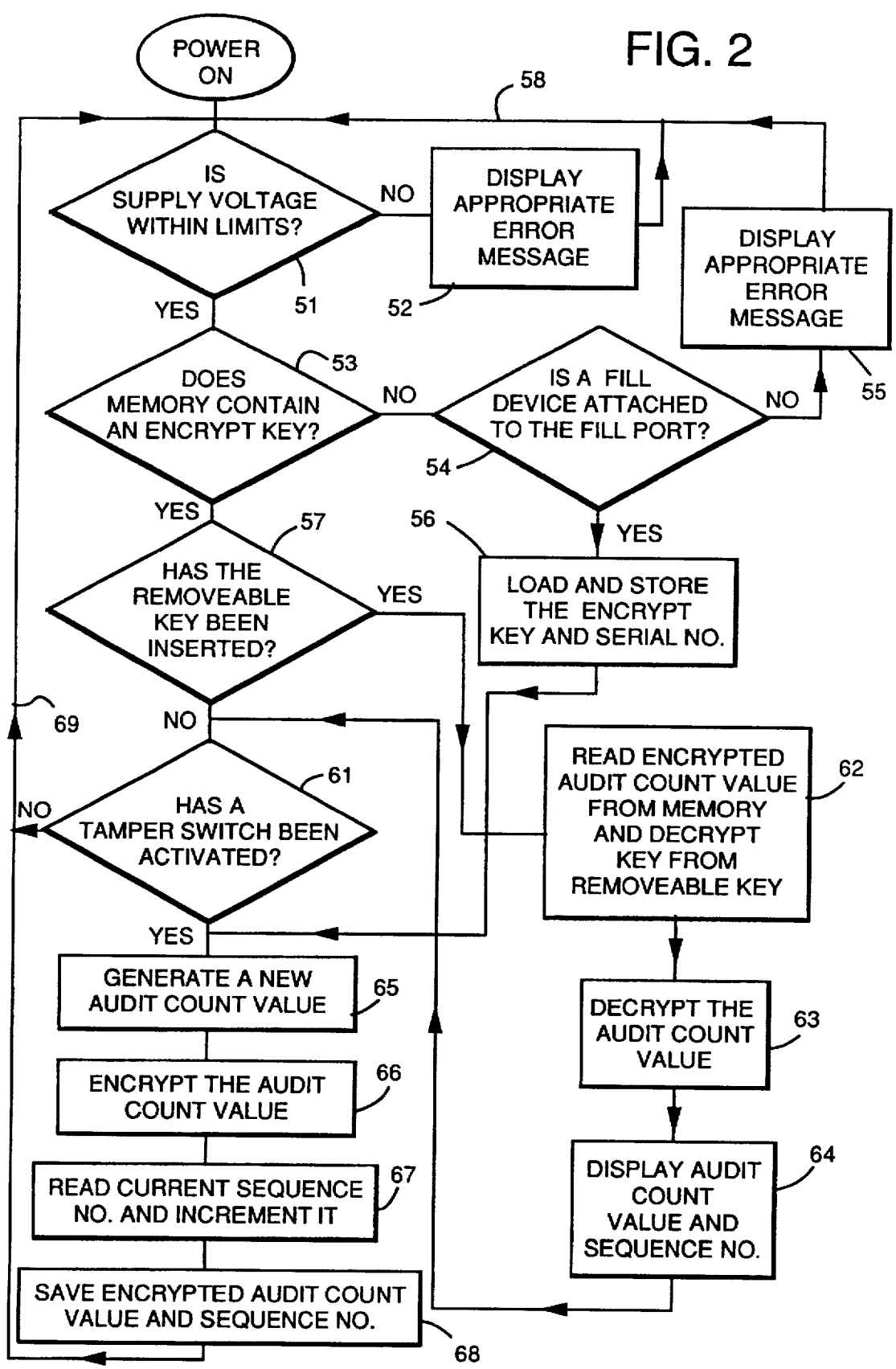

SYSTEM AND METHOD FOR TAMPER DETECTION

This is a continuation application Ser. No. 07/994,439, filed Dec. 21, 1992, now abandoned, which is a continuation of application Ser. No. 674,823, filed Mar. 22, 1991, now abandoned.

BACKGROUND

The present invention relates generally to security systems and methods, and more particularly, to a tamper-proof security system and method that incorporates a non-forgeable seal that detects intrusion by unauthorized persons into equipment.

Electronic equipment is used in a wide variety of applications. Some of this equipment, such as medical equipment and air traffic control systems, could cause a loss of life if unauthorized modifications are made to them. Other applications could lead to significant losses to property as well as life, such as those systems which control automated manufacturing processes, for example. Unauthorized modifications to electronic equipment used in military and Government applications could result in a weakening of our national defense or economy. Commercial environments could also suffer economic losses as well as loss of proprietary information. In all cases, the original equipment manufacturer's credibility could be damaged, and they could be exposed to legal actions. It is therefore critical that a non-forgeable seal be placed on the equipment to indicate when unauthorized internal access has been gained.

There are many environments other than electronic equipment that may require tamper-proof seals. For example, it may be desirable to detect if a briefcase containing sensitive documents or valuable jewels had been opened by its courier, or if a shipping container used to transport nuclear weapons materials or other precious cargo had been opened. Current techniques, such as placing paper labels over access covers or wire seals through locking mechanisms, for example, are not sufficient to prevent a motivated adversary from gaining undetected access, and electronic methods can usually be reset to disguise the fact that access had been made.

More specifically, the most common technique for detecting unauthorized access is to place a paper seal with a validation stamp over two mating covers or over the screws which hold the covers in place. This offers only minimal protection because blank seals can usually be easily obtained or copied, and validation stamps can be easily forged. In addition, personnel authorized to install the seals can be bribed or extorted into applying a new seal. Electronic methods typically consist of placing sensors within the enclosure to detect cover removal, which then activates alarms or erases sensitive information. Their weakness is that a mechanism to reset these circuits after normal maintenance functions must be provided. An enemy agent or subverted maintenance personnel can therefore take advantage of these mechanisms to evade its protection.

Another conventional approach is to electronically display the date and time that access was last made. This can be subverted, however, by replacing the mechanism with a false one set to display the time prior to the unauthorized access. In addition, this mechanism must have the capability to allow the date and time to be initially set, which can also be used by an adversary to reset the indication to the previous value.

Intrusion detection is a related technology, however it cannot be applied in certain situations. For example, audible or visual signaling devices are not likely to be noticed if used on a large shipping container sent overseas or by train, and RF transmitters and receivers can be temporarily disabled by removing the antenna. In fact, even the most sophisticated alarm systems have been evaded simply by coercing key individuals into disarming the system. In contrast, a truly effective tamper detection system would not even allow authorized persons to obtain undetected access.

Therefore, an objective of the present invention is to overcome the weaknesses of conventional systems and methods by providing an electronic indication which cannot be predicted, which mechanism cannot be reset or forged, and which cannot be replaced without detection.

SUMMARY OF THE INVENTION

In order to overcome the limitations of conventional intrusion deterrent systems and methods, the present invention provides an electronic indication that access has been gained to a system. Unlike other methods, the mechanisms used by the present invention cannot be forged, bypassed, or subverted. In fact, even persons authorized to access the environment cannot do so without leaving evidence. In the present invention, when a tamper detection sensor is activated, a random number is generated. This random number, referred to as an audit count, is then encrypted and stored, and a sequence number is incremented. To recover this information at a later time, a trusted individual inserts an external device containing the decryption key. The decryption key is extracted, and the encrypted audit count is decrypted and displayed along with the sequence number. Periodic verification that the audit count and sequence number have not changed provides assurance that access has not been gained to the system.

It is believed that the combined operations of generating a random number each time access is gained, and limiting its recovery only to authorized personnel in possession of a uniquely keyed and physically separate device, results in an unforgeable seal which provides better protection against undetected access than any of the techniques currently used.

This invention may be used in multi-level secure computer products to help meet the National Computer Security Center's requirement for life-cycle integrity assurance. In products such as air traffic control systems, and air defense and radar systems, for example, it provides confidence that the equipment has not been covertly modified for purposes such as sabotage. As an industrial or commercial product, it may be used in a wide variety of applications, including non-electronic ones that indicate when shipping containers, truck trailers, or safes and vaults have been tampered with. Its use may also reduce a manufacturer's liability by providing legal evidence that an unauthorized modification to its product had taken place.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a flow diagram of the processing algorithm used in the system of FIG. 1.

DETAILED DESCRIPTION

Figure 1:
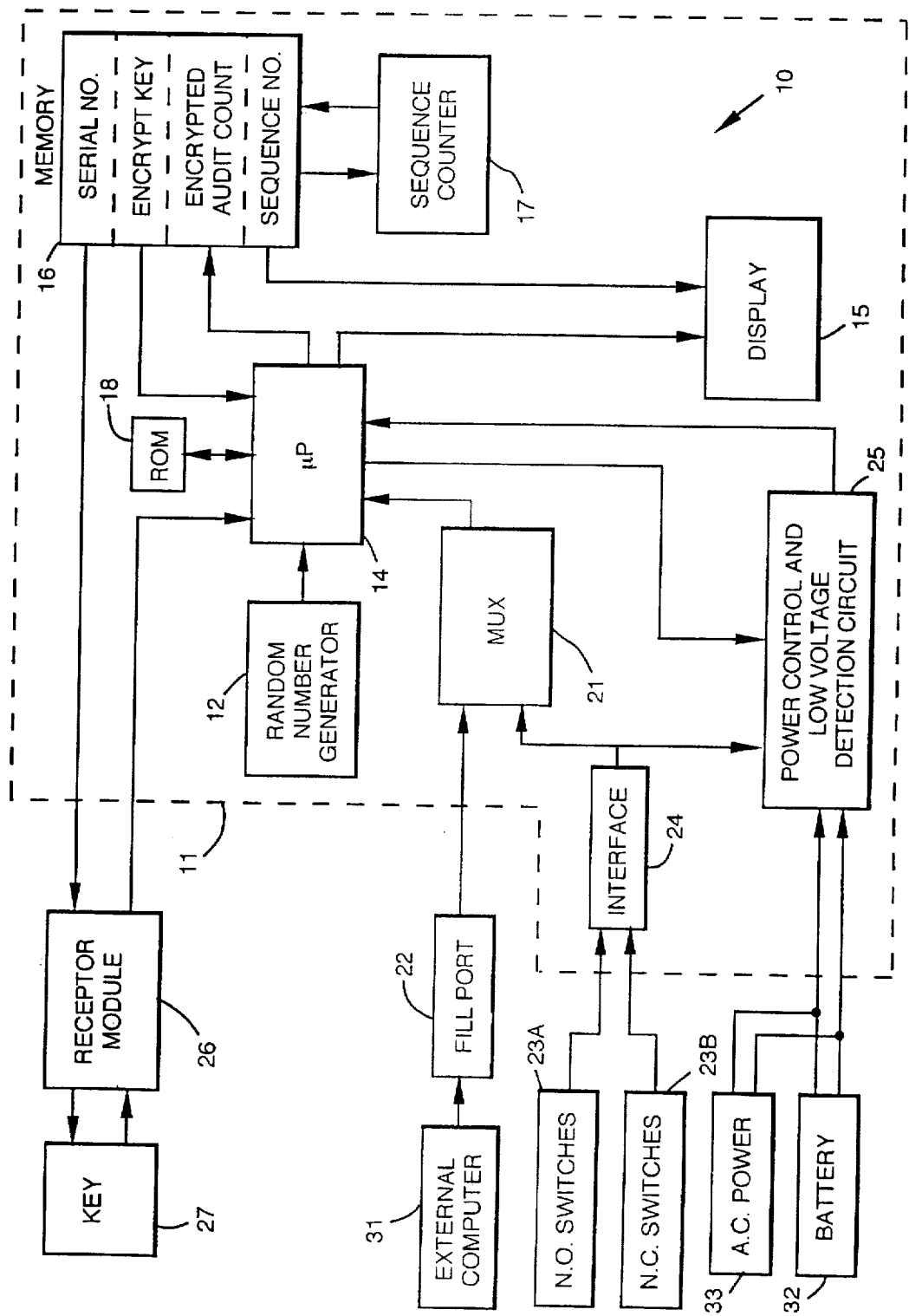
FIG. 1 is illustratrative of a tamper-proof security system and method in accordance with the principles of the present invention for use with equipment that incorporates a non-forgeable seal that detects intrusion.

Referring to the drawing, FIG. 1 shows a block diagram of a tamper-proof security system 10 in accordance with the principles of the present invention. The system includes a display module 11, for example, that comprises substantially all of the electronics used in the system 10. The display module 11 includes a random number generator 12 that is coupled to a computer, or microprocessor (µP) 14, that is adapted to run an algorithm that is described below with reference to FIG. 2. The microprocessor 14 has an output that drives a display 15, and an output identified as an encrypted audit count that is generated by an algorithm that is stored in a read only memory (ROM) 18.

The encrypted audit count value stored is then in a nonvolatile random access memory 16. The encrypted audit count may also be fed back to an input of the microprocessor 14 to allow decryption of the encrypted audit count value by the the algorithm. Also stored in the memory 16 are a serial number, an encrypt key, and a sequence number that is generated by a sequence counter 17. The sequence number is also coupled to the display 15 for presentation to a user. The encrypt key is coupled to the microprocessor 14.

A multiplexer 21 is provided to mute control data by way of a fill port 22. A plurality of external normally open or normally closed switches 23A, 23B, are coupled to a sensor interface 24 whose outputs are then coupled to the multiplexer 21. A power control and low voltage detection circuit 25 receives input power from a battery 32 or AC power source 33 to provide power to the circuitry of the display module 11.

A receptor module 26, that may be external to the display module 11, is adapted to receive a removable device, such as a removable preprogrammed electronic key 27, that permits an authorized user to interrogate the system 10. The key 27 may be a programmable credit card key device, for example, that contains preprogrammed information, such as the serial number stored in the memory 16 and a decrypt key that is coupled into the algorithm in the microprocessor 14.

In operation, the receptor module 26 provides the mechanical and electrical interfaces to the key 27, which contains the decrypt key and associated serial number. The display module 11 is typically housed within a monitored enclosure. The algorithm running in the microprocessor 14 performs the encryption and decryption functions as well as overall control of the system 10. Any conventional cryptographic algorithm may be used, including symmetric, such as the Data Encryption Standard (DES) or asymmetric, such as the Rivest Shamir Aldeman (RSA) types, allowing flexibility to meet a variety of system-specific requirements. The RSA algorithm has an advantage in that different, but mathematically related, encrypt and decrypt keys are used, therefore enhancing the security provided by the system 10 of the present invention.

The random number generator 12, generates the random numbers used as the audit count value. Its output may be deterministic or nondeterministic. Deterministic sequences are easier to generate, but they can be predicted if the algorithm is known, its period is computationally short, and a sufficient number of samples can be obtained for analysis. Nondeterministic sequences are based on random physical processes, and are therefore better, but are also more difficult to design and implement. The intent of the present invention may be met with either type, so the choice may be based on the requirements of the system with which it is used.

The memory 16 provides nonvolatile storage of a unique serial number for the system 10, the encrypt key, the encrypted audit count value, and a sequence number. Since it must retain this information even without power, an EEPROM or equivalent device device may be employed as the memory 16.

The display 15 may be a visual alphanumeric display for indicating the audit count and sequence number. Since many types of indicators perform equally well, the type best suited to the particular application may be used. The number of characters to be displayed is also not restricted to allow specific system requirements to be met. A typical application would probably use three decimal characters for the sequence number, and four hexadecimal characters for the audit count. This supports 1,000 sequence numbers and 65,536 different audit counts, although these may be increased if desired.

The sensor interface 24 accepts input from both normally-open and normally-closed switches 23A, 23B, and initiates the generation of a new audit count when activated. This allows any type of tamper detection sensor to be used, since even the most sophisticated ones are compatible with these standards.

The multiplexer 21 allows programing of the encrypt key and serial number from an external device, such as an external computer 31, for example. The external computer 31 may also be a specialized version of the key 27, depending upon the requirements of the system 10.

The sequence counter 17 reads the current sequence number from the memory 16, increments it by one, and stores it back in the memory 16. The sequence number is not encrypted since this would require that the decrypt key be retained within the memory 16, thus reducing the work factor required for an adversary to recover it. The overall security of the approach is not reduced, however, as long as the audit count remains encrypted.

The power control circuit 25 performs two functions. First, it removes power from all elements of the system 10 except the switches 23A, 23B to minimize power consumption. When individual switches 23A, 23B are activated, the power control circuit 25 supplies power to the other elements of the display module 11 so that they can perform their functions. When this is completed, the power control circuit 25 removes power until the next activation. Its other function is to monitor input power to detect low battery voltage and cause the display 15 to provide an appropriate message. The power control circuit 25 is optional in the sense that the present invention may be implemented without it, although it is expected that it would be desirable for most implementations.

Certain installations may wish to use the present system 10 in a number of physically separate enclosures, some possibly dispersed over a wide area. By assigning a unique electronic identifier to each display module 11, such as a serial number, a single key 27 may be used with many display modules 11. When inserted into a receptor module 26, the display module 11 would supply its identifier which the removable key 27 would then use to select the proper decrypt key.

The above description assumes that the display 15 is within the display module 11 and the removable key 27 only contains the decrypt keys. Another variation of this architecture places the display 15 and another microprocessor that implements the same algorithm in the removable key 27. Generation and encryption of audit counts are then performed as described above. When the key 27 is inserted, however, the encrypted audit count and sequence number are transferred to it, then decrypted and displayed from within the key. The advantage of this approach is that a single key 27 may be used with a number of display modules 11, simplifying its use and reducing implementation costs.

When any of the switches 23A, 23B are activated, it signals the microprocessor 14 to extract the encrypt key from the memory 16 for use by the algorithm. The random number generator 12 generates a new audit count, which then is encrypted by the algorithm and stored in the memory 16, and the sequence number is incremented and stored in the memory 16.

When the key 27 is later inserted into the receptor module 26, the microprocessor 14 extracts the decrypt key for use by the algorithm, reads the encrypted audit count from the memory 16, then causes the algorithm to decrypt it and then displays the result. The sequence number is also extracted and displayed. The display 15 is only active while the key 27 is inserted.

FIG. 2 illustrates a flow chart of a typical algorithm employed by the system 10. Once power is turned on for the system 10, power supply voltage is determined in box 51, and if it is not within predefined limits of operation, an error message is displayed on the display 15, as indicated in box 52. Thereafter, control is returned to the the beginning of the algorithm, as is indicated by feedback line 58. Next, the memory 16 is scanned to determine if it contains an encrypt key, as indicated in box 53. If no encrypt key is present, then it is determined if an external computer 31, or other input device, is coupled to the fill port 22. If not, then an appropriate error message or other indication is provided to the operator, as is indicated by boxes 54 and 55, and control is returned to the the beginning of the algorithm, as is indicated by feedback line 58.

However, if the computer 31 is coupled to the fill port 22, then an encrypt key and serial number are accepted from the computer 31 and loaded and stored in the memory 16, as is indicated in box 56. A new audit count is then generated by the random number generator 12 and encrypted by the microprocessor 14 using the new encrypt key, the current sequence number is incremented by the sequence counter 17, then both the new encrypted audit count and sequence number are stored in the memory 16. Control is then returned to the beginning of the algorithm, as indicated by feedback line 69.

On the other hand, if the memory 16 already contains an encrypt key, as is determined by box 53, then it is determined if the removeable key 27 has been inserted into the receptor module 26. If so, the appropriate decrypt key will be read from the removeable key 27 and used by the microprocessor 14 to decrypt the encrypted audit count stored in the memory 16, as shown in boxes 62 and 63. The microprocessor 14 then causes the decrypted audit count and sequence number to be displayed (box 64). Control is then transferred to a point above the decision box 61 regarding tamper switch activation.

Then, if a tamper switch 23A, 23B has been activated (box 61), then a new audit count value is generated (box 65), the audit count value is encrypted (box 66), the current sequence number is read and incremented (box 67), and the encrypted audit count value and sequence number are saved to the memory 16 (box 68). Thereafter, control is returned to the the beginning of the algorithm, as is indicated by feedback line 69. If a tamper switch 23A, 23B has not been activated (box 61), then control is returned to the beginning of the algorithm by way of return line 69.

To illustrate a typical installation, assume that the concepts of this invention are used to monitor for unauthorized internal access to a mainframe computer. It is assumed that conventional anti-tamper techniques have been used in the design of the enclosure and placement of the switches 23A, 23B and associated wiring. It is also assumed that the display module 11 has been assembled using conventional anti-reverse-engineering techniques.

The display module 11 is mounted within the computer with its display 15 visible through a small window, for example, and a number of microswitches (switches 23A, 23B) are installed on the various cover panels of the enclosure. A rechargeable battery 32 supplies power to the display module 11 when line power is not available. The receptor module 26, in this example, is designed to accept the key 27, and is mounted adjacent to the display 15 so that the key 27 can be easily inserted. An encrypt key was previously programmed into the display module 11, and the corresponding decrypt key was similarly programmed into the key 27.

After initial system installation, a system administrator inserts his, or her, key 27 and records the date, time, audit count, and sequence number in a system log, then removes the key 27. This is repeated periodically, perhaps at the beginning of each shift. When a cover is removed to perform routine maintenance, a new audit count is generated and the sequence number is incremented. When servicing is completed, the system administrator again inserts the key 27 and records the new audit count value and sequence number in the log, along with an explanation of the maintenance performed and the name of the technician. The technician verifies the entry and signs the log. If at some later time the audit count or sequence number is different than the last log entry, with no justification, a breach of the system's integrity has occurred. Appropriate steps may then be taken to investigate the cause.

In order for an access to the equipment to go undetected, the audit count and sequence number must be returned to their previous values. The attacker would need to recover the encrypt key, the algorithm, and the encrypted audit count from the display module 11, and then use that information to calculate the decrypt key before the audit count can be obtained. This requires that significant reverse-engineering and computational resources be applied to that particular display module 11, and would therefore be too expensive, time consuming, and risky to be practical.

The use of random audit counts prevents forgery of the system logs. For example, if a simple incrementing access count was used, anyone could read the last count from the log, make a new entry with it incremented by one, and forge the system administrator's signature. The removable key 27 would not be required for this attack to succeed.

If a sequence number were not used, it would be theoretically possible, although not very likely, that an attacker in possession of the key 27 could continuously remove and replace a cover until the previous audit count reoccurred. Use of a sequence number therefore ensures that this type of attack will be detected due to the gap in sequence numbers when compared to the audit logs. Eventually, however, the sequence number will reach its maximum value and begin counting again from zero. Since the audit counts are random, however, the probability of the same audit count occurring when the sequence number reached its previous value is extremely small. In any case, this would require a significant amount of time, increasing the attacker's risk of being discovered.

Changing the encrypt and decrypt keys or the serial number will also not allow the system 10 to be subverted. This simply initiates the same processes as if a tamper switch 23A, 23B had been activated. Since the sequence number is incremented, not reset, this attack will not succeed.

The display module 11 cannot be replaced with a false unit because the current audit count cannot be determined by the attacker, and removal of its power after access has been gained cannot interrupt the process. For example, a simple microprocessor-based implementation is able to complete all of the operations within about 250 milliseconds. A discrete implementation, such as with a gate array, for example, can complete the operations within 1 millisecond. Clearly, either implementation does not allow enough time to remove a cover and then interrupt its power before the new audit count can be generated and stored.

Although it is possible for a person with the key 27 to gain unauthorized access and update the log with the new audit count, neither he nor anyone else can gain access without leaving evidence in the form of changed audit counts. Since this places a greater degree of responsibility on persons who possess the key 27, and limits the number of suspects if an unauthorized modification is later discovered, a deterrent effect is provided as well.

Thus there has been described a new and improved tamper-proof security system and method for use with equipment that incorporates a non-forgeable seal that detects intrusion by unauthorized persons. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Intrusion detection apparatus for use with a system, said apparatus comprising:

sensing means for sensing a physical intrusion into the system and for generating an intrusion indication signal in response thereto;

a random number generator for generating a random number comprising an audit count value in response to the intrusion indication signal;

computer means coupled to the sensing means and random number generator that comprises a predetermined electronic encryption key for encrypting the audit count value using the predetermined electronic encryption key in combination with a predetermined encryption algorithm to provide an encrypted audit count value;

a sequence counter coupled to the computer means for incrementing a sequence number in response to the intrusion indication signal to provide an incremented sequence number that indicates a total number of physical intrusions into the system;

memory means coupled to the computer means and the sequence counter for storing the predetermined electronic encryption key, the encrypted audit count value, and the incremented sequence number;

a physically removable device that is couplable to the computer means and that comprises a predetermined electronic decryption key that is distinct from the predetermined electronic encryption key and that operates in combination with a predetermined decryption algorithm that runs on the computer to (1) decrypt the encrypted audit count value and cause the display of expected values of the incremented sequence number and decrypted audit count value to an authorized user that should be displayed the next time physical access is gained to the system and to (2) subsequently decrypt the encrypted audit count value and cause the display of the incremented sequence number and decrypted audit count value to an authorized user that is compared with the expected values thereof to determine whether physical access has been gained to the system; and a display coupled to the computer means and the memory means for displaying the decrypted audit count value and the incremented sequence number each time the electronic decryption key is used.

2. The apparatus of claim 1 wherein the physically removable device comprises the display means, and further comprises computer means for decrypting the encrypted audit count value using the predetermined electronic encryption key in combination with the predetermined encryption algorithm to provide the decrypted audit count value, which decrypted audit count value and incremented sequence number are displayed to the authorized user.

3. A method of determining whether physical access has been gained to a system, said method comprising the steps of:

sensing a physical intrusion into the system and generating an intrusion indication signal in response thereto;

generating a random number comprising an audit count in response to the intrusion indication signal;

encrypting the random number using a predetermined electronic encryption key in combination with a predetermined encryption algorithm to provide an encrypted audit count;

incrementing a sequence number to provide an incremented sequence number that indicates a total number of physical intrusions into the system;

storing the predetermined electronic encryption key, the encrypted audit count and the incremented sequence number;

decrypting the encrypted audit count using a physically removable electronic decryption key that is distinct from the predetermined electronic encryption key in combination with a predetermined decryption algorithm to provide a decrypted audit count;

displaying the decrypted audit count and the incremented sequence number to an authorized user of the system to provide an indication of an expected sequence number and audit count value that should be displayed the next time physical access is gained to the system;

verifying whether physical access has been gained to the system by decrypting the encrypted audit count using the electronic decryption key in combination with the predetermined decryption algorithm to provide a decrypted audit count, and displaying the decrypted audit count and the incremented sequence number to an authorized user of the system; and comparing the decrypted audit count and incremented sequence number with the expected audit count and incremented sequence number to determine whether physical access has been gained to the system.

4. The method of claim 3 which further comprises the steps of:

storing an electronic serial number for the system; and using the electronic serial number to select an electronic decryption key for the system from a predetermined set of electronic decryption keys for a plurality of systems.

5. The method of claim 3 which further comprises the steps of:

providing an input port for receiving the electronic encryption key from an external computer;

generating a new audit count in response to receipt of the electronic encryption key from the external computer;

encrypting the new audit count using the electronic encryption key received from the external computer to provide an encrypted audit count;

incrementing the sequence number to provide an incremented sequence number; and storing the encrypted audit count and incremented sequence number.

\* \* \* \* \*